United States Patent
Khandelwal

(10) Patent No.: US 9,753,810 B1
(45) Date of Patent: Sep. 5, 2017

(54) SYSTEMS AND METHODS FOR BACKING UP VIRTUAL MACHINES DEPLOYED IN VIRTUAL STORAGE AREA NETWORKS

(71) Applicant: Symantec Corporation, Mountain View, CA (US)

(72) Inventor: Atul Khandelwal, Pune (IN)

(73) Assignee: Veritas Technologies, Mountain View, CA (US)

( * ) Notice: Subject to any disclaimer, the term of this patent is extended or adjusted under 35 U.S.C. 154(b) by 461 days.

(21) Appl. No.: 14/445,028

(22) Filed: Jul. 28, 2014

(51) Int. Cl.
- *G06F 17/30* (2006.01)
- *G06F 7/00* (2006.01)
- *G06F 11/14* (2006.01)
- *H04L 29/08* (2006.01)

(52) U.S. Cl.
CPC ...... *G06F 11/1446* (2013.01); *H04L 67/1002* (2013.01)

(58) Field of Classification Search
None
See application file for complete search history.

(56) References Cited

U.S. PATENT DOCUMENTS

| | | | | |
|---|---|---|---|---|
| 6,920,494 B2* | 7/2005 | Heitman | G06F 3/0601 709/220 |
| 7,191,304 B1* | 3/2007 | Cameron | G06F 11/1456 707/999.202 |
| 7,669,020 B1* | 2/2010 | Shah | G06F 11/1458 711/162 |
| 8,346,727 B1* | 1/2013 | Chester | G06F 17/30233 707/640 |
| 8,621,463 B2* | 12/2013 | Fuhrman | G06F 9/5077 718/1 |
| 8,635,429 B1* | 1/2014 | Naftel | G06F 12/16 711/162 |
| 8,719,286 B1* | 5/2014 | Xing | G06F 11/1451 707/755 |
| 8,751,515 B1* | 6/2014 | Xing | G06F 17/30073 707/755 |
| 9,170,831 B2* | 10/2015 | Robinson | G06F 9/485 |
| 9,229,850 B1* | 1/2016 | Wang | G06F 9/5016 |
| 9,411,535 B1* | 8/2016 | Shemer | G06F 3/0655 |
| 9,471,441 B1* | 10/2016 | Lyadvinsky | G06F 11/1464 |
| 2010/0083251 A1* | 4/2010 | Mccrory | G06F 9/455 718/1 |

(Continued)

OTHER PUBLICATIONS

"Hypervisor", http://en.wikipedia.org/wiki/Hypervisor, as accessed May 28, 2014, Wikipedia, (May 20, 2005).

*Primary Examiner* — Jeffrey A Burke
(74) *Attorney, Agent, or Firm* — FisherBroyles LLP

(57) ABSTRACT

The disclosed computer-implemented method for backing up virtual machines deployed in virtual storage area networks may include (1) detecting an attempt to back up a virtual machine deployed in a virtual storage area network, (2) identifying, within the virtual storage area network, a plurality of virtual servers that are each hosting a portion of the virtual machine, (3) obtaining each portion of the virtual machine in parallel from the plurality of virtual servers within the virtual storage area network, and then (4) backing up each portion of the virtual machine obtained from the plurality of virtual servers. Various other methods, systems, and computer-readable media are also disclosed.

18 Claims, 6 Drawing Sheets

(56) References Cited

U.S. PATENT DOCUMENTS

2014/0196056 A1\* 7/2014 Kottomtharayil ....... G06F 9/505
                                                                718/105
2015/0242283 A1\* 8/2015 Simoncelli .......... G06F 11/1456
                                                                711/162

\* cited by examiner

| Configuration File for VM 214 |||||
|---|---|---|---|---|
| PORTIONS OF VM | Portion of VM 210(1) | ••• | Portion of VM 210(N) |
| VIRTUAL SERVERS HOSTING PORTIONS | Virtual Server 202(1) | ••• | Virtual Server 202(N) |
| STORAGE LOCATIONS OF PORTIONS | 0xF0A7D8C0 | ••• | 0x05F5E100 |
| EXTENTS OF PORTIONS | 10 Megabytes | ••• | 20 Megabytes |

*FIG. 4*

SYSTEMS AND METHODS FOR BACKING UP VIRTUAL MACHINES DEPLOYED IN VIRTUAL STORAGE AREA NETWORKS

BACKGROUND

Virtual Storage Area Networks (VSANs) may facilitate the distributed deployment of Virtual Machines (VMs). For example, a VSAN may include a plurality of virtual servers that host certain objects and/or components of a VM in a distributed configuration. In this example, one of these virtual servers may store a configuration file that identifies all of the VM's objects and/or components as well as their corresponding storage locations throughout the VSAN.

Unfortunately, due at least in part to the distributed nature of this deployment, conventional backup technologies may be unable to back up VMs deployed in VSANs without experiencing certain shortcomings and/or inefficiencies. For example, a conventional backup technology may initiate a backup of a VM by sending a backup request to the virtual server storing the VM's configuration file. In response to this backup request, the virtual server may begin to assemble all of the VM's objects and/or components by determining, based on the VM's configuration file, which of the VM's objects and/or components are hosted locally and which of the VM's objects and/or components are hosted remotely by other virtual servers. The virtual server may then gather the VM's locally hosted objects and/or components and obtain the VM's remotely hosted objects and/or components over the VSAN. By having the virtual server obtain the VM's remotely hosted objects and/or components over the VSAN, the conventional backup technology may potentially cause and/or lead to increased bandwidth consumption, performance bottlenecking, sequential backup processing, VSAN latency, and/or slow backup operations.

The instant disclosure, therefore, identifies and addresses a need for improved systems and methods for backing up VMs deployed in VSANs.

SUMMARY

As will be described in greater detail below, the instant disclosure describes various systems and methods for backing up VMs deployed in VSANs by enabling backup hosts to obtain the VMs' objects and/or components in parallel from multiple virtual servers within the VSANs. In one example, a computer-implemented method for backing up VMs deployed in VSANs may include (1) detecting an attempt to back up a VM deployed in a VSAN, (2) identifying, within the VSAN, a plurality of virtual servers that are each hosting a portion of the VM, (3) obtaining each portion of the VM in parallel from the plurality of virtual servers within the VSAN, and then (4) backing up each portion of the VM obtained from the plurality of virtual servers. In such an example, the method may further include obtaining each portion of the VM directly from the plurality of virtual servers without generating any network traffic over the VSAN.

In one example, the method may also include identifying, within the plurality of virtual servers, a parent virtual server that stores a configuration file for the VM. For example, the method may include determining which of the plurality of virtual servers has registered the VM. In such an example, the method may further include obtaining the configuration file for the VM from the parent virtual server identified within the plurality of virtual servers.

In one example, the configuration file for the VM may identify (1) each virtual server that is hosting a portion of the VM, (2) a storage location of each portion of the VM, and/or (3) an extent of each portion of the VM. Additionally or alternatively, the method may include determining, based at least in part on the configuration file for the VM, which virtual servers within the VSAN are hosting a portion of the VM.

In one example, the method may also include requesting each portion of the VM from the plurality of virtual servers such that the plurality of virtual servers provide each portion of the VM to a backup host in a substantially simultaneous process. Additionally or alternatively, the method may include reading, by a backup host, each portion of the VM from the plurality of virtual servers in a substantially simultaneous process.

In one example, the method may also include identifying a portion of the VM that is mirrored on multiple virtual servers within the plurality of virtual servers. In such an example, the method may further include determining which of the multiple virtual servers mirroring the portion of the VM currently has the lowest resource load. Additionally or alternatively, the method may include obtaining the mirrored portion of the VM from the virtual server that currently has the lowest resource load among the multiple virtual servers.

In one example, the method may also include performing a load-balancing operation that enables an underutilized virtual server whose resource load is less than at least one of the plurality of virtual servers to provide at least some of the portion of the VM hosted by the at least one of the plurality of virtual servers to a backup host. In this example, the load-balancing operation may include (1) directing the underutilized virtual server to obtain the at least some of the portion of the VM from the at least one of the plurality of virtual servers via the VSAN and then (2) obtaining, by the backup host, the at least some of the portion of the VM from the underutilized virtual server.

As another example, a system for implementing the above-described method may include (1) a detection module, stored in memory, that detects an attempt to back up a VM deployed in a VSAN, (2) an identification module, stored in memory, that identifies, within the VSAN, a plurality of virtual servers that are each hosting a portion of the VM, (3) an obtainment module, stored in memory, that obtains each portion of the VM in parallel from the plurality of virtual servers within the VSAN, (4) a backup module, stored in memory, that backs up each portion of the VM obtained from the plurality of virtual servers, and (5) at least one processor that executes the detection module, the identification module, the obtainment module, and the backup module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt to back up a VM deployed in a VSAN, (2) identify, within the VSAN, a plurality of virtual servers that are each hosting a portion of the VM, (3) obtain each portion of the VM in parallel from the plurality of virtual servers within the VSAN, and then (4) back up each portion of the VM obtained from the plurality of virtual servers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary configuration file for a VM.

Figure 1:
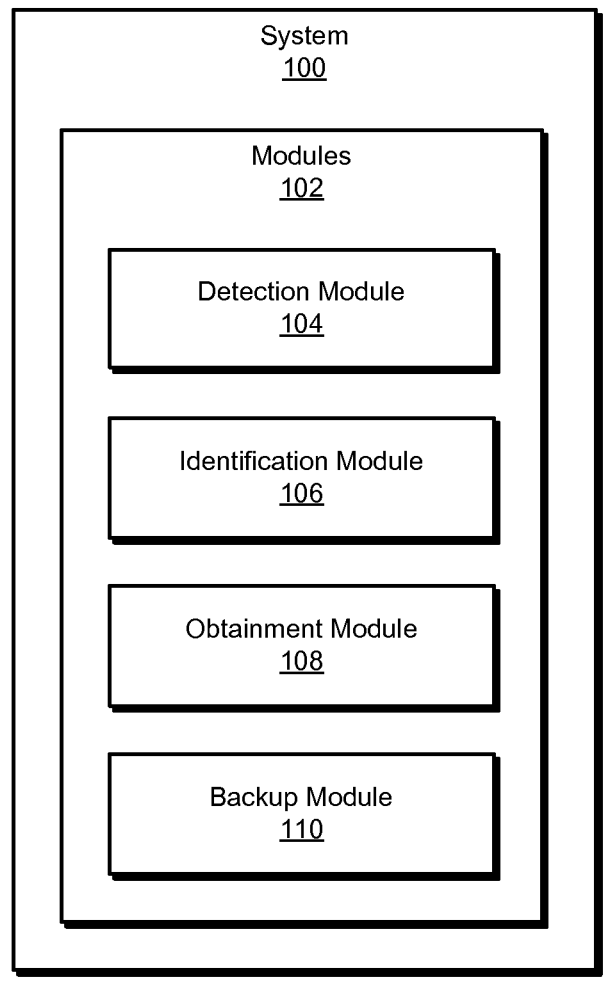
FIG. 1 is a block diagram of an exemplary system for backing up VMs deployed in VSANs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for backing up VMs deployed in VSANs. As will be explained in greater detail below, by obtaining a VM's configuration file from a virtual server within a VSAN, the various systems and methods described herein may be able to determine which virtual servers within the VSAN are hosting objects and/or components of the VM. Upon determining which virtual servers are hosting the VM's objects and/or components, the various systems and methods described herein may obtain these objects and/or components directly from the virtual servers without impacting the amount of network traffic travelling over the VSAN.

By obtaining these objects and/or components directly from the virtual servers without impacting the amount of network traffic travelling over the VSAN, the various systems and methods described herein may potentially reduce and/or alleviate bandwidth consumption, performance bottlenecking, and/or VSAN latency. Additionally or alternatively, these systems and methods may potentially facilitate simultaneous and/or parallel backup processing as well as faster backup operations.

Figure 2:
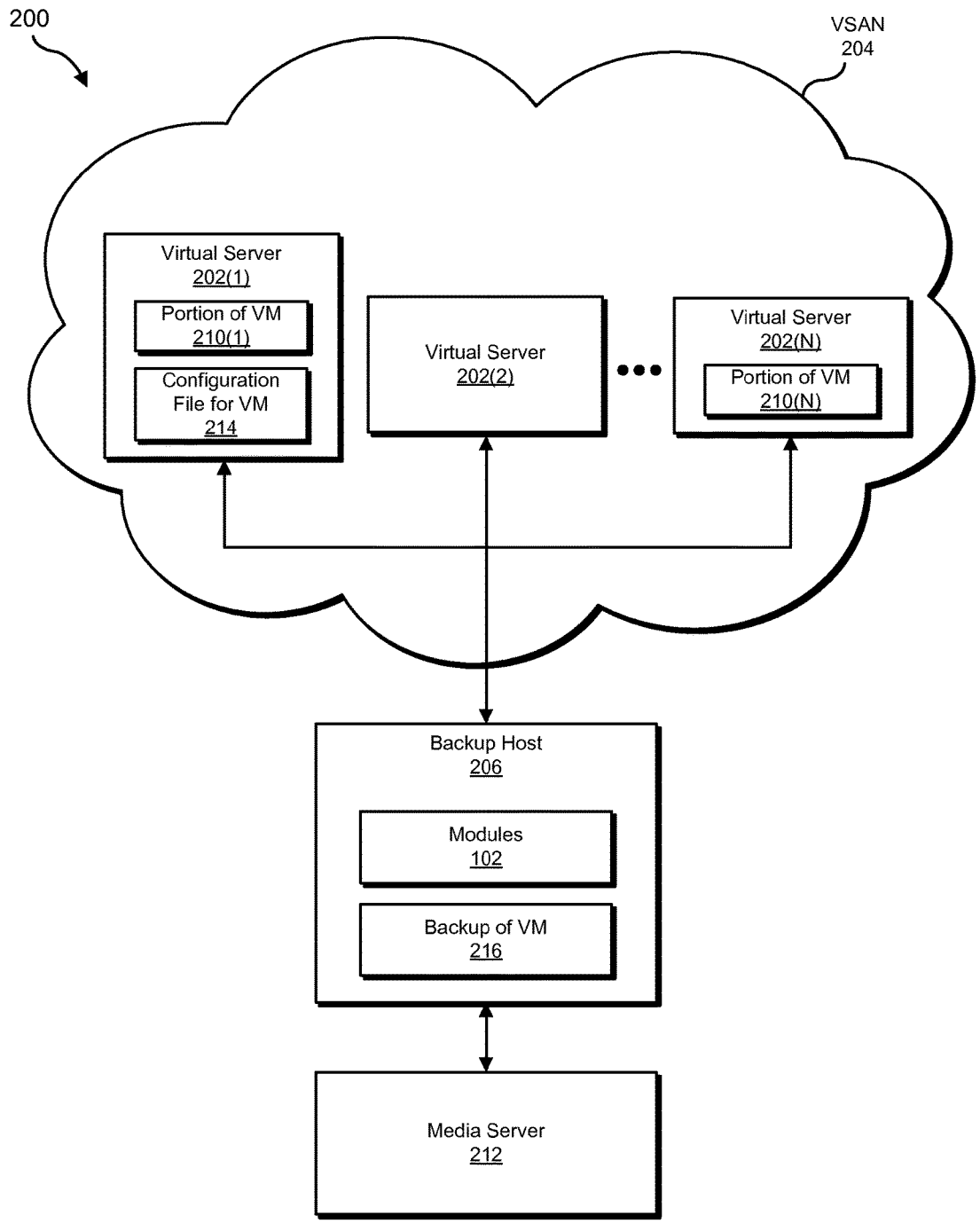
FIG. 2 is a block diagram of an additional exemplary system for backing up VMs deployed in VSANs.

The following will provide, with reference to FIGS. 1-2, detailed descriptions of exemplary systems for backing up VMs deployed in VSANs. Detailed descriptions of corresponding computer-implemented methods will be provided in connection with FIG. 3. Detailed descriptions of an exemplary configuration file for a VM will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for backing up VMs deployed in VSANs. As illustrated in this figure, exemplary system 100 may include one or more modules 102 for performing one or more tasks. For example, and as will be explained in greater detail below, exemplary system 100 may also include a detection module 104 that detects an attempt to back up a VM deployed in a VSAN. Exemplary system 100 may additionally include an identification module 106 that identifies, within the VSAN, a plurality of virtual servers that are each hosting a portion of the VM. Exemplary system 100 may also include an obtainment module 108 that obtains each portion of the VM in parallel from the plurality of virtual servers within the VSAN. Exemplary system 100 may additionally include a backup module 110 that backs up each portion of the VM obtained from the plurality of virtual servers. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, COMMVAULT SIMPANA, SYSTEM RESTORE, and/or SYNCBACK).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., virtual servers 202(1)-(N), backup host 206, and/or media server 212), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a VSAN 204 with virtual servers 202(1)-(N). Additionally or alternatively, system 200 may include a backup host 206 in communication with a media server 212 and/or one or more of virtual servers 202(1)-(N) within VSAN 204.

In one example, backup host 206 may have a direct communication link with each of virtual servers 202(1)-(N). These direct communication links may lie outside of VSAN 204. In other words, these direct communication links may fail to implicate and/or belong to VSAN 204.

In one example, one or more of virtual servers 202(1)-(N) may include and/or store certain portions of a VM. The term "virtual machine" and the abbreviation "VM," as used herein, generally refer to any type or form of operating system environment that is abstracted from computing hardware by a virtual machine manager (e.g., a hypervisor). The term "portion," as used herein in connection with a VM, generally refers to any type or form of object, component, and/or data of the VM.

As an example, virtual server 202(1) may include and/or store a portion 210(1) of a VM. Additionally or alternatively, virtual server 202(N) may include and/or store a portion 210(N) of the VM. In this example, portions 210(1)-(N) may represent objects, components, and/or data of a single VM distributed across multiple virtual servers within VSAN 204. As shown in FIG. 2, virtual server 202(2) may fail to include and/or store any portion of this VM.

In one example, virtual servers 202(1) and 202(N) may include and/or store certain portions of other VMs (not illustrated in FIG. 2). Additionally or alternatively, virtual server 202(2) may include certain portions of other VMs (not illustrated in FIG. 2).

In one example, virtual server 202(1) may represent a parent server for the VM within VSAN 204. In other words, virtual server 202(1) may have registered the VM and/or include a configuration file 214 for the VM. The term "configuration file," as used herein, generally refers to any type or form of file, data, and/or information that identifies and/or indicates the storage locations of certain portions of a VM distributed across multiple servers within a VSAN. For example, configuration file 214 may identify (1) virtual servers 202(1) and 202(N) as each hosting a portion of the VM, (2) the corresponding storage location of each portion of the VM stored on virtual servers 202(1) and 202(N), and/or (3) the corresponding extent of each portion of the VM stored on virtual servers 202(1) and 202(N).

As shown in FIG. 2, backup host 206 may be programmed with one or more of modules 102. Additionally or alternatively, backup host 206 may include and/or store a backup 216 of the VM. The term "backup," as used herein in connection with a VM, generally refers to any type or form of file and/or image that includes objects, components, data, metadata, and/or information of a VM. For example, backup 216 may represent a copy of the VM that facilitates restoration of at least a portion of the VM. Examples of backup 216 include, without limitation, full backup images, incremental backup images, differential backup images, accelerated backup images, deduplicated backup images, synthetic backup images, snapshots, combinations of one or more of the same, or any other suitable backup.

In one example, backup host 206 may create backup 216 based at least in part on portions 210(1)-(N) of the VM obtained directly from virtual servers 202(1) and 202(N). Additionally or alternatively, backup host 206 may store backup 216 of the VM locally and/or remotely. For example, backup host 206 may store backup 216 of the VM in media server 212.

In one embodiment, one or more of modules 102 from FIG. 1 may, when executed by at least one processor of backup host 206, enable backup host 206 to back up VMs deployed in VSANs. For example, and as will be described in greater detail below, one or more of modules 102 may cause backup host 206 to (1) detect an attempt to back up a VM deployed in VSAN 204, (2) identify, within VSAN 204, virtual servers 202(1) and 202(N) as each hosting a portion of the VM, (3) obtain each portion of the VM in parallel from virtual servers 202(1) and 202(N) within VSAN 204, and then (4) back up each portion of the VM obtained from virtual servers 202(1) and 202(N).

Virtual servers 202(1)-(N) generally represent any type or form of virtual computing device. In one example, one or more of virtual servers 202(1)-(N) may include and/or represent hypervisors (such as a bare-metal, native, type 1 hypervisors) that run directly on physical computing devices. For example, one or more of virtual servers 202(1)-(N) may include and/or represent VMWARE ESX servers. Additionally or alternatively, the one or more of virtual servers 202(1)-(N) may control the physical computing devices and/or manage VMs. Examples of such physical computing devices include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Backup host 306 generally represents any type or form of computing device capable of backing up VMs deployed in VSANs. Examples of backup host 306 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

VSAN 204 generally represents any collection and/or combination of network ports included in a medium or architecture capable of facilitating communication or data transfer. In one example, VSAN 204 may include a subset of network ports within a single switching device. Additionally or alternatively, VSAN 204 may include various network ports partitioned across a plurality of switching devices. VSAN 204 may also share certain physical computing resources (such as network ports) with one or more other VSANs (not illustrated in FIG. 2). Moreover, VSAN 204 may facilitate communication among virtual servers 202(1)-(N).

Media server 212 generally represents any type or form of computing device capable of storing, maintaining, providing, and/or synthesizing backups of VMs. Examples of media server 212 include, without limitation, application servers, web servers, storage servers, deduplication servers, and/or database servers configured to run certain software applications and/or provide various web, storage, deduplication, and/or database services.

Figure 3:
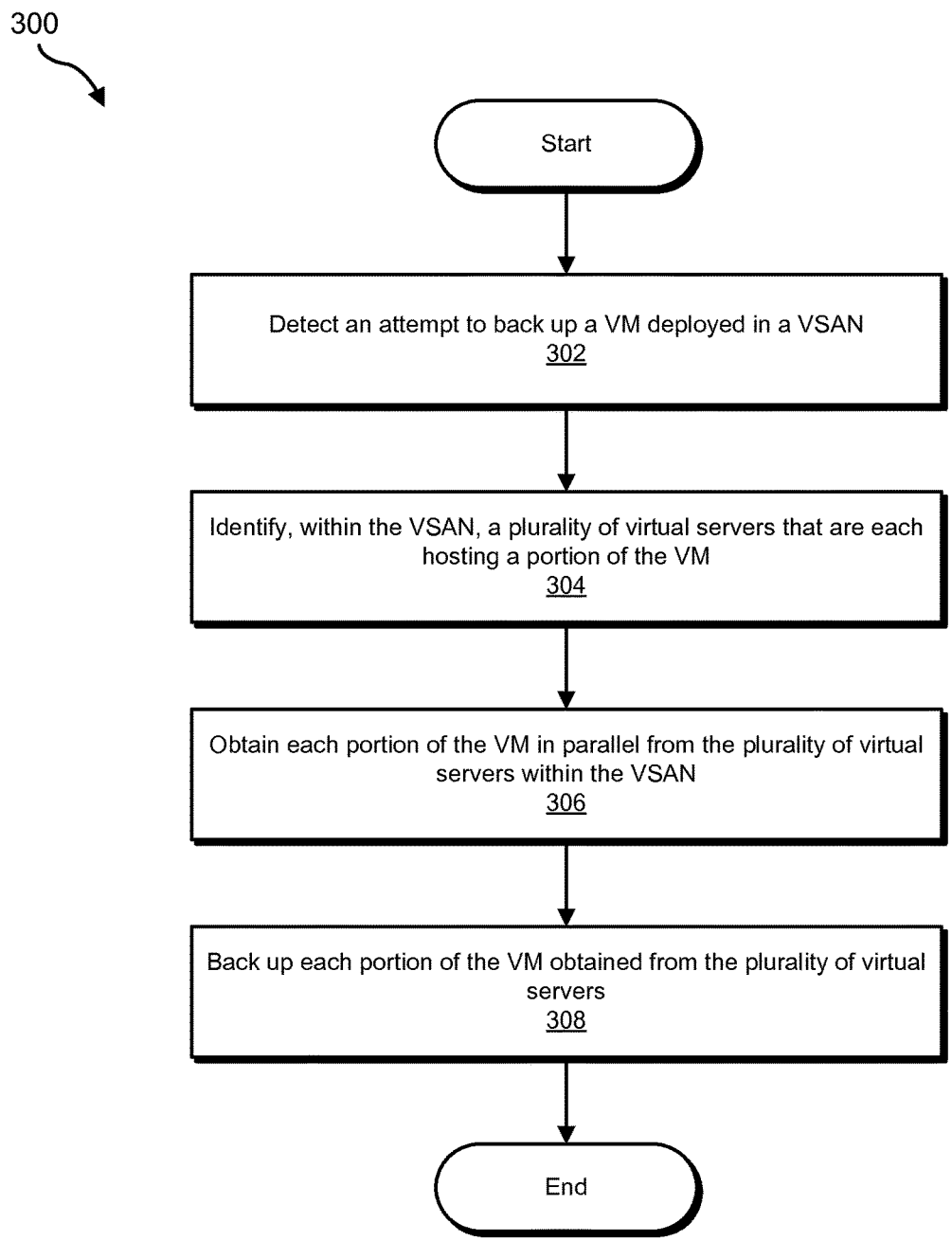
FIG. 3 is a flow diagram of an exemplary method for backing up VMs deployed in VSANs.

FIG. 3 is a flow diagram of an exemplary computer-implemented method 300 for backing up virtual machines deployed in virtual storage area networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect an attempt to back up a VM deployed in a VSAN. For example, at step 302 detection module 104 may, as part of backup host 206 in FIG. 2, detect an attempt to back up a VM deployed in VSAN 204. In this example, the VM may include portions 210(1)-(N) distributed across multiple virtual servers within VSAN 204.

The systems described herein may perform step 302 in a variety of ways and/or contexts. In one example, detection module 104 may detect the attempt to back up the VM based at least in part on a backup request. For example, an administrator of VSAN 204 may submit a backup request to initiate a backup of the VM. In this example, backup host 206 may receive the backup request from the administrator. As backup host 206 receives the backup request, detection module 104 may determine that the administrator is attempting to back up the VM based at least in part on the backup request.

In another example, detection module 104 may detect the attempt to back up the VM based at least in part on a scheduled backup operation. For example, detection module 104 may locate a schedule of backup operations on backup host 206. In this example, detection module 104 may determine when the next backup operation is scheduled to be performed on the VM based at least in part on the schedule of backup operations.

Additionally or alternatively, detection module 104 determine that backup host 206 performs backup operations on a periodic basis. For example, detection module 104 may determine the frequency and/or timing of backup operations performed on the VM. In this example, detection module 104 may determine when the next backup operation will be performed on the VM based at least in part on the frequency and/or timing of such backup operations.

In one example, detection module 104 may detect the attempt to back up the VM upon initiation of a backup operation. For example, detection module 104 may monitor backup host 206 for any evidence of a backup operation. While monitoring backup host 206, detection module 104 may detect certain backup activity indicating that backup host 206 has initiated a backup operation on the VM. Detection module 104 may then determine that backup host 206 has initiated this backup operation based at least in part on the detected backup activity.

Returning FIG. 3, at step 304 one or more of the systems described herein may identify, within the VSAN, a plurality of virtual servers that are each hosting a portion of the VM. For example, at step 304 identification module 106 may, as part of backup host 206 in FIG. 2, identify virtual servers 202(1) and 202(N) within VSAN 204 as each hosting a portion of the VM. As will be described in greater detail below, some of the virtual servers within VSAN 204 may be hosting portions of the VM while other virtual servers within VSAN 204 may not be hosting any of the VM.

The systems described herein may perform step 304 in a variety of ways and/or contexts. In some examples, identification module 106 may identify which virtual servers within VSAN 204 are hosting portions of the VM based at least in part on configuration file 214 for the VM. In one example, identification module 106 may identify a parent server that stores configuration file 214 for the VM within VSAN 204. For example, identification module 106 may determine that the VM is registered with virtual server 202(1) within VSAN 204. Obtainment module 108 may then obtain configuration file 214 for the VM from virtual server 202(1).

In one example, obtainment module 108 may direct backup host 206 to request configuration file 214 for the VM from virtual server 202(1). In response to this request from backup host 206, virtual server 202(1) may provide configuration file 214 directly to backup host 206 without impacting the amount of network traffic travelling over VSAN 204. As configuration file 214 reaches backup host 206, obtainment module 108 may obtain configuration file 214.

Once obtainment module 108 has obtained configuration file 214, identification module 106 may determine which virtual servers within VSAN 204 are hosting portions of the VM based at least in part on configuration file 214. For example, identification module 106 may analyze configuration file 214. In this example, identification module 106 may determine that portions 210(1) and 210(N) of the VM are running on virtual servers 202(1) and 202(N), respectively, based at least in part on the analysis of configuration file 214.

In one example, identification module 106 may identify the storage location of each portion of the VM based at least in part on configuration file 214. As illustrated in FIG. 4, configuration file 214 may identify each portion of the VM (in this example, "Portion of VM 210(1)" and "Portion of VM 210(N)"), each virtual server that is hosting a portion of the VM (in this example, "Virtual Server 202(1)" and "Virtual Server 202(N)"), the storage location and/or starting address of each portion of the VM (in this example, "0xF0A7D8C0" and "0x05F5E100"), and/or the extent and/or size of each portion of the VM (in this example, "10 Megabytes" and "20 Megabytes"). In this example, identification module 106 may determine that the VM includes portions 210(1) and 210(N) stored on virtual servers 202(1) and 202(N), respectively, based at least in part on configuration file 214. Additionally or alternatively, identification module 106 may determine that portions 210(1) and 210(N) are stored at starting addresses 0xF0A7D8C0 and 0x05F5E100, respectively, and/or include 10 Megabytes of data and 20 Megabytes of data, respectively, based at least in part on configuration file 214.

In one example, identification module 106 may identify a portion of the VM that is mirrored on multiple virtual servers within VSAN 204. For example, identification module 106 may determine that portion 210(1) of the VM is mirrored on virtual server 202(1) and another virtual server (not illustrated in FIG. 2) within VSAN 204. In other words, identification module 106 may determine that portion 210(1) of the VM is running on both virtual server 202(1) and this other virtual server within VSAN 204.

Returning to FIG. 3, at step 306 one or more of the systems described herein may obtain each portion of the VM in parallel from the plurality of virtual servers within the VSAN. For example, at step 306 obtainment module 108 may, as part of backup host 206 in FIG. 2, obtain portions 210(1) and 210(N) of the VM in parallel from virtual servers 202(1) and 202(N) within VSAN 204. In other words, obtainment module 108 may obtain portions 210(1) and 210(N) of the VM from the plurality of virtual servers 202(1) and 202(N) in a substantially simultaneous process.

The systems described herein may perform step 306 in a variety of ways and/or contexts. In one example, obtainment module 108 may obtain portions 210(1) and 210(N) of the VM directly from virtual servers 202(1) and 202(N) without generating any network traffic over VSAN 204. For example, and as described above, backup host 206 may have a direct communication link with each of virtual servers 202(1)-(N). In this example, obtainment module 108 may direct backup host 206 to obtain portions 210(1) and 210(N) of the VM from virtual servers 202(1) and 202(N) via these direct communication links.

Since, in this example, these direct communication links do not represent part of VSAN 204, backup host 206 may be able to obtain portions 210(1) and 210(N) of the VM without impacting the amount of network traffic travelling over VSAN 204. By obtaining these portions of the VM without impacting the amount of network traffic travelling over VSAN 204, backup host 206 may be able to potentially reduce and/or alleviate bandwidth consumption, performance bottlenecking, and/or network latency in connection with VSAN 204.

In one example, obtainment module 108 may obtain portions 210(1) and 210(N) of the VM by requesting these portions of the VM from virtual servers 202(1) and 202(N). For example, obtainment module 108 may direct backup host 206 to request portions 210(1) and 210(N) of the VM from virtual servers 202(1) and 202(N), respectively. Since, in this example, virtual server 202(2) does not include and/or store any portion of the VM, backup host 206 may have no need to request anything from virtual server 202(2) in connection with this VM.

In response to these requests, virtual servers 202(1) and 202(N) may provide portions 210(1) and 210(N), respectively, to backup host 206 in a substantially simultaneous process. In other words, virtual servers 202(1) and 202(N) may each send portions 210(1) and 210(N), respectively, to backup host 206 at substantially the same time. As portions 210(1) and 210(N) of the VM reach backup host 206, obtainment module 108 may obtain these portions of the VM. By having virtual servers 202(1) and 202(N) send portions 210(1) and 210(N), respectively, in this way, backup host 206 may be able to facilitate simultaneous and/or parallel backup processing, thereby potentially resulting in faster backup operations.

In one example, obtainment module 108 may obtain portions 210(1) and 210(N) of the VM by reading these portions of the VMs from the virtual servers 202(1) and 202(N). For example, obtainment module 108 may direct backup host 206 to read portions 210(1) and 210(N) of the VM from virtual servers 202(1) and 202(N), respectively. Since, in this example, virtual server 202(2) does not include and/or store any portion of the VM, obtainment module 108 may have no need to read anything from virtual server 202(2) in connection with this VM. Backup host 206 may read portions 210(1) and 210(N) of the VM from virtual servers 202(1) and 202(N), respectively, in a substantially simultaneous process. In other words, backup host 206 may read each of portions 210(1) and 210(N) of the VM from virtual servers 202(1) and 202(N), respectively, at substantially the same time.

In the event that a portion of the VM is mirrored on multiple virtual servers within VSAN 204, obtainment module 108 may obtain the mirrored portion of the VM from the virtual server that currently has the lowest resource load among the multiple virtual servers. For example, and as described above, portion 210(1) of the VM may be mirrored on virtual server 202(1) and another virtual server (not illustrated in FIG. 2) within VSAN 204. In this example, identification module 106 may determine that virtual server 202(1) is using less Central Processing Unit (CPU) and/or memory than the other virtual server. In response to this determination, obtainment module 108 may obtain portion 210(1) of the VM from virtual server 202(1) since virtual server 202(1) has more CPU and/or memory available than the other virtual server.

In one example, obtainment module 108 may perform a load-balancing operation that enables an underutilized virtual server to provide at least some of a portion of the VM to backup host 206. The term "underutilized virtual server," as used herein, generally refers to any type or form of virtual server whose resource load is less than at least one virtual server hosting a portion of a VM. For example, identification module 106 may determine that virtual server 202(2) is using less CPU and/or memory than virtual server 202(1) and/or virtual server 202(N). In response to this determination, obtainment module 108 may perform a load-balancing operation that enables virtual server 202(2) to provide at least some of portion 210(1) and/or portion 210(N) of the VM to backup host 206 on behalf of virtual server 202(1) and/or virtual server 202(N), respectively.

As another example, identification module 106 may determine that virtual server 202(1) is using less CPU and/or memory than virtual server 202(2) and/or virtual server 202(N). In response to this determination, obtainment module 108 may perform a load-balancing operation that enables virtual server 202(1) to provide at least some of portion 210(N) of the VM to backup host 206 on behalf of virtual server 202(N).

In one example, obtainment module 108 may perform the load-balancing operation by directing the underutilized virtual server to obtain the at least some of the portion of the VM via VSAN 204. For example, obtainment module 108 may direct virtual server 202(2) to obtain at least some of portion 210(1) and/or portion 210(N) of the VM from virtual server 202(1) and/or virtual server 202(N), respectively, via VSAN 204. In this example, virtual server 202(2) may provide at least some of portion 210(1) and/or portion 210(N) of the VM to backup host 206. As this portion of the VM reaches backup host 206 from the underutilized virtual server, obtainment module 108 may obtain this portion of the VM.

Returning to FIG. 3, at step 308 one or more of the systems described herein may back up each portion of the virtual machine obtained from the plurality of virtual servers. For example, at step 308 backup module 110 may, as part of backup host 206 in FIG. 2, back up portions 210(1) and 210(N) of the VM obtained from virtual servers 202(1) and 202(N). By backing up portions 210(1) and 210(N) of the VM in this way, backup module 110 may facilitate restoration of such portions of the VM in the event of a system failure and/or disaster.

The systems described herein may perform step 308 in a variety of ways and/or contexts. In one example, backup module 110 may back up portions 210(1) and 210(N) of the VM by creating backup 216 in FIG. 2. For example, backup module 110 may create backup 216 from portions 210(1) and 210(N) of the VM obtained from virtual servers 202(1) and 202(N). Upon creating backup 216, backup module 110 may store backup 216 locally on backup host 216. Additionally or alternatively, backup module 110 may store backup 216 remotely on media server 212 and/or any other storage device (such as a disk storage device, a solid-state drive, a flash memory drive, a tape storage device, and/or a deduplication storage device).

As explained above in connection with method 300, a backup host may back up a VM deployed in a VSAN. For example, a backup host may initiate a backup of a VM deployed in a VSAN by identifying each VMWARE ESX server within the VSAN that is hosting certain objects and/or components of the VM. Upon identifying these ESX servers, the backup host may obtain all of objects and/or components of the VM in parallel directly from these ESX servers.

By obtaining these objects and/or components directly from the ESX servers, the backup host may be able to back up the VM without impacting the amount of network traffic travelling over the VSAN. Accordingly, the backup host may potentially reduce and/or alleviate bandwidth consumption, performance bottlenecking, and/or VSAN latency. Moreover, by obtaining these objects and/or components in parallel from the ESX servers, the backup host may facilitate simultaneous and/or parallel backup processing, thereby potentially resulting in faster backup operations.

Figure 5:
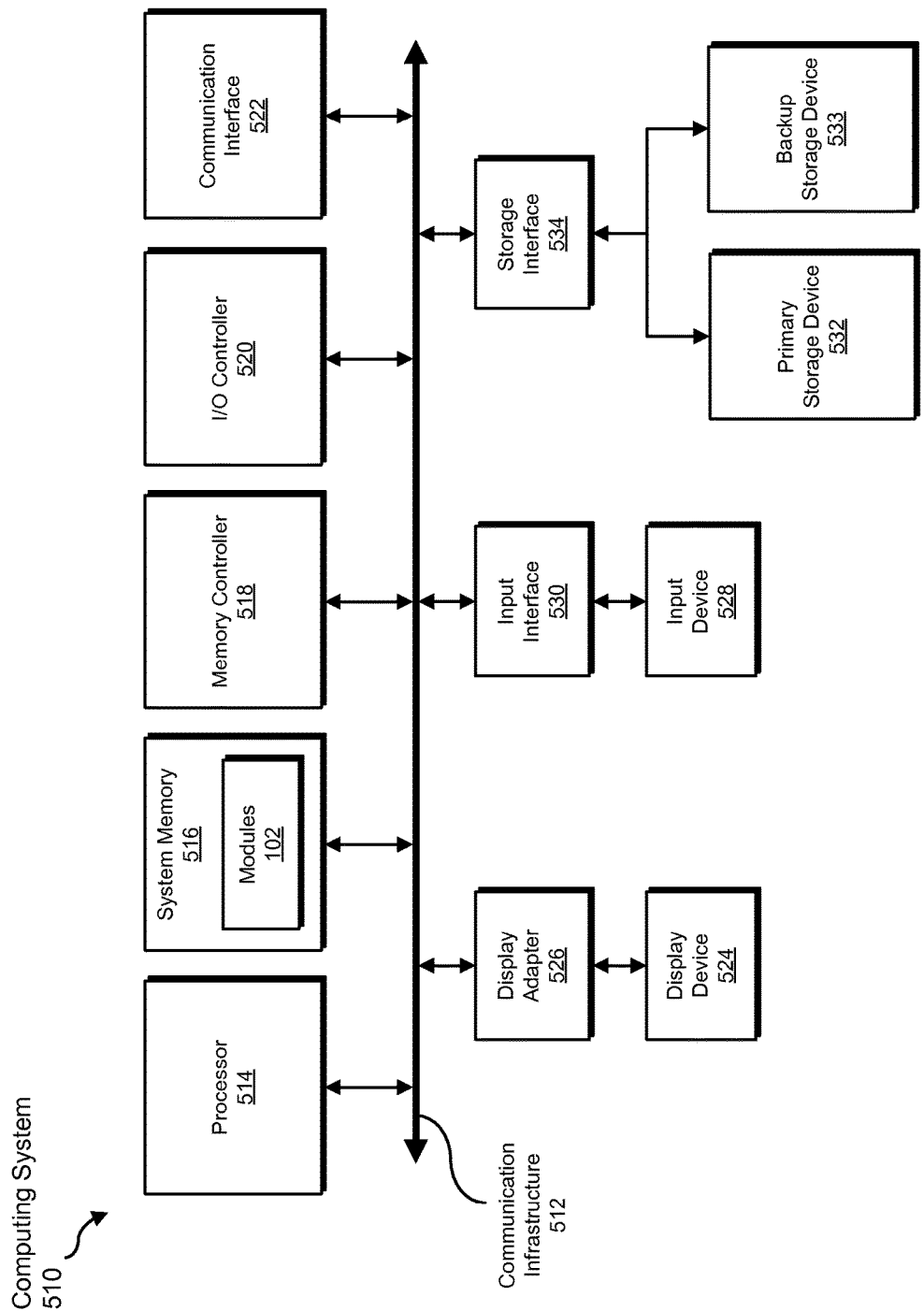
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
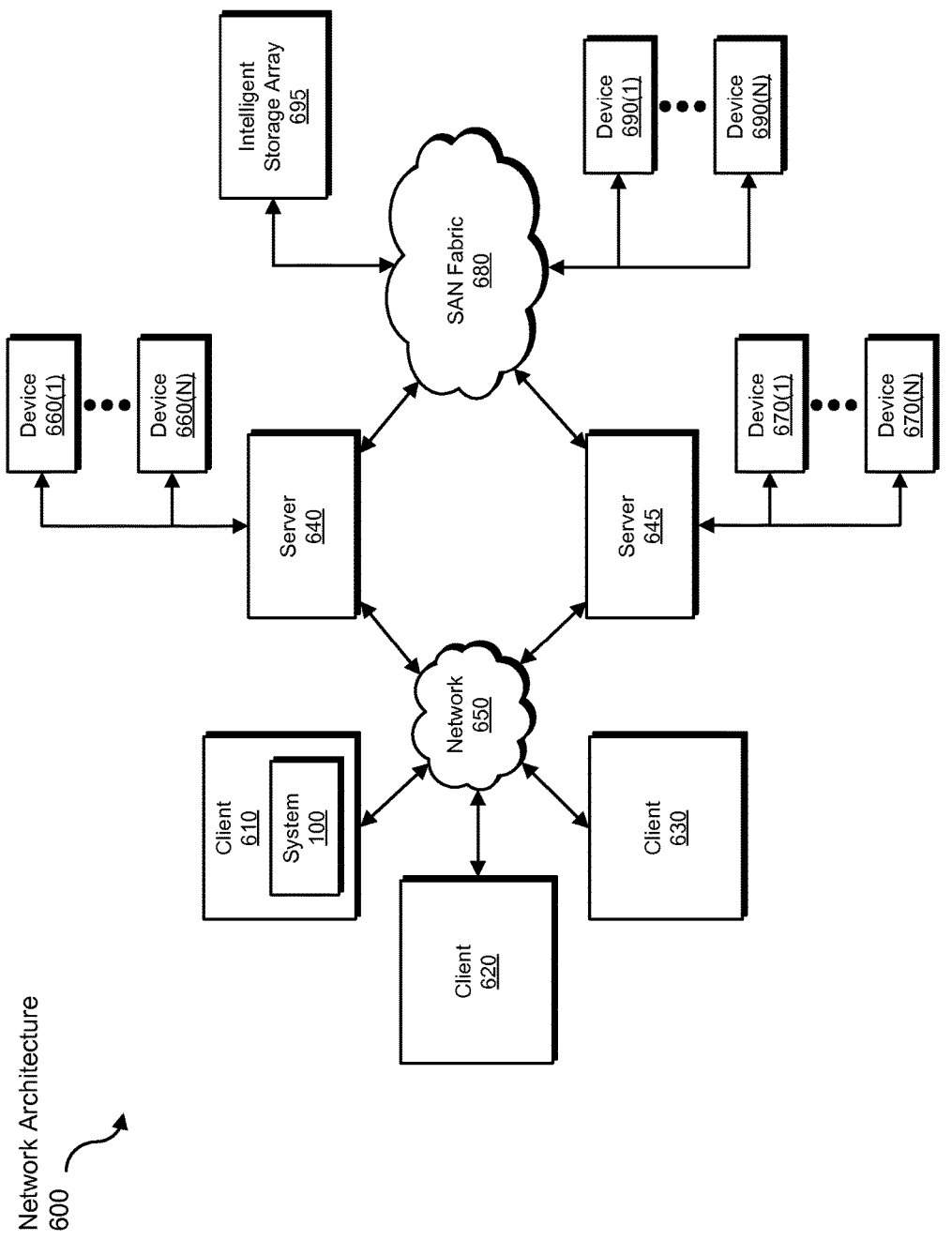
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for backing up virtual machines deployed in virtual storage area networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a VM. Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive portions of a VM to be transformed, transform the portions of the VM, output a result of the transformation to back up the VM, use the result of the transformation to facilitate restoration of the VM, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for backing up virtual machines deployed in virtual storage area networks, at least a portion of the method being performed by a computing device comprising at least one processor, the method comprising:
   detecting an attempt to back up a virtual machine deployed in a virtual storage area network;
   identifying, within the virtual storage area network, a plurality of virtual servers that are each hosting a portion of the virtual machine, wherein identifying the plurality of virtual servers comprises:
      identifying a portion of the virtual machine that is mirrored on multiple virtual servers within the plurality of virtual servers;
      determining which of the multiple virtual servers mirroring the portion of the virtual machine currently has the lowest resource load;
   obtaining each portion of the virtual machine in parallel from the plurality of virtual servers within the virtual storage area network, wherein obtaining each portion of the virtual machine comprises obtaining the mirrored portion of the virtual machine from the virtual server that currently has the lowest resource load among the multiple virtual servers;
   backing up each portion of the virtual machine obtained from the plurality of virtual servers.

2. The method of claim 1, wherein identifying the plurality of virtual servers that are each hosting a portion of the virtual machine comprises:
   identifying, within the plurality of virtual servers, a parent virtual server that stores a configuration file for the virtual machine;
   obtaining the configuration file for the virtual machine from the parent virtual server identified within the plurality of virtual servers;
   determining, based at least in part on the configuration file for the virtual machine, which virtual servers within the virtual storage area network are hosting a portion of the virtual machine.

3. The method of claim 2, wherein identifying the parent virtual server that stores the configuration file for the virtual machine comprises determining which of the plurality of virtual servers has registered the virtual machine.

4. The method of claim 2, wherein the configuration file for the virtual machine identifies:
   each virtual server that is hosting a portion of the virtual machine;
   a storage location of each portion of the virtual machine;
   an extent of each portion of the virtual machine.

5. The method of claim 1, wherein obtaining each portion of the virtual machine in parallel from the plurality of virtual servers comprises requesting each portion of the virtual machine from the plurality of virtual servers such that the plurality of virtual servers provide each portion of the virtual machine to a backup host in a substantially simultaneous process.

6. The method of claim 1, wherein obtaining each portion of the virtual machine in parallel from the plurality of virtual servers comprises reading, by a backup host, each portion of the virtual machine from the plurality of virtual servers in a substantially simultaneous process.

7. The method of claim 1, wherein obtaining each portion of the virtual machine in parallel from the plurality of virtual servers comprises performing a load-balancing operation that enables an underutilized virtual server whose resource load is less than at least one of the plurality of virtual servers to provide at least some of the portion of the virtual machine hosted by the at least one of the plurality of virtual servers to a backup host.

8. The method of claim 7, wherein performing the load-balancing operation comprises:
   directing the underutilized virtual server to obtain the at least some of the portion of the virtual machine from the at least one of the plurality of virtual servers via the virtual storage area network;
   obtaining, by the backup host, the at least some of the portion of the virtual machine from the underutilized virtual server.

9. The method of claim 1, wherein obtaining each portion of the virtual machine in parallel from the plurality of virtual servers comprises obtaining each portion of the virtual machine directly from the plurality of virtual servers.

10. A system for backing up virtual machines deployed in virtual storage area networks, the system comprising:
   a detection module, stored in memory, that detects an attempt to back up a virtual machine deployed in a virtual storage area network;
   an identification module, stored in memory, that identifies, within the virtual storage area network, a plurality of virtual servers that are each hosting a portion of the virtual machine, wherein identifying the plurality of virtual servers comprises:

identifying a portion of the virtual machine that is mirrored on multiple virtual servers within the plurality of virtual servers;

determining which of the multiple virtual servers mirroring the portion of the virtual machine currently has the lowest resource load;

an obtainment module, stored in memory, that obtains each portion of the virtual machine in parallel from the plurality of virtual servers within the virtual storage area network, wherein obtaining each portion of the virtual machine comprises obtaining the mirrored portion of the virtual machine from the virtual server that currently has the lowest resource load among the multiple virtual servers;

a backup module, stored in memory, that backs up each portion of the virtual machine obtained from the plurality of virtual servers;

at least one processor that executes the detection module, the identification module, the obtainment module, and the backup module.

11. The system of claim 10, wherein:

the identification module identifies, within the plurality of virtual servers, a parent virtual server that stores a configuration file for the virtual machine;

the obtainment module obtains the configuration file for the virtual machine from the parent virtual server identified within the plurality of virtual servers;

the identification module identifies the plurality of virtual servers by determining, based at least in part on the configuration file for the virtual machine, which virtual servers within the virtual storage area network are hosting a portion of the virtual machine.

12. The system of claim 11, wherein the identification module identifies the parent virtual server that stores the configuration file for the virtual machine by determining which of the plurality of virtual servers has registered the virtual machine.

13. The system of claim 11, wherein the configuration file for the virtual machine identifies:

each virtual server that is hosting a portion of the virtual machine;

a storage location of each portion of the virtual machine;

an extent of each portion of the virtual machine.

14. The system of claim 10, wherein the obtainment module obtains each portion of the virtual machine in parallel by requesting each portion of the virtual machine from the plurality of virtual servers such that the plurality of virtual servers provide each portion of the virtual machine to a backup host in a substantially simultaneous process.

15. The system of claim 10, wherein the obtainment module obtains each portion of the virtual machine in parallel by reading, by a backup host, each portion of the virtual machine from the plurality of virtual servers in a substantially simultaneous process.

16. The system of claim 10, wherein the obtainment module performs a load-balancing operation that enables an underutilized virtual server whose resource load is less than at least one of the plurality of virtual servers to provide at least some of the portion of the virtual machine hosted by the at least one of the plurality of virtual servers to a backup host.

17. The system of claim 16, wherein the obtainment module performs the load-balancing operation by:

directing the underutilized virtual server to obtain the at least some of the portion of the virtual machine from the at least one of the plurality of virtual servers via the virtual storage area network;

obtaining, at the backup host, the at least some of the portion of the virtual machine from the underutilized virtual server.

18. A non-transitory computer-readable medium comprising one or more computer-executable instructions that, when executed by at least one processor of a computing device, cause the computing device to:

detect an attempt to back up a virtual machine deployed in a virtual storage area network;

identify, within the virtual storage area network, a plurality of virtual servers that are each hosting a portion of the virtual machine, wherein identifying the plurality of virtual servers comprises:

identifying a portion of the virtual machine that is mirrored on multiple virtual servers within the plurality of virtual servers;

determining which of the multiple virtual servers mirroring the portion of the virtual machine currently has the lowest resource load;

obtain each portion of the virtual machine in parallel from the plurality of virtual servers within the virtual storage area network, wherein obtaining each portion of the virtual machine comprises obtaining the mirrored portion of the virtual machine from the virtual server that currently has the lowest resource load among the multiple virtual servers;

back up each portion of the virtual machine obtained from the plurality of virtual servers.

* * * * *